US010481594B2

(12) United States Patent
Ayabakan et al.

(10) Patent No.: US 10,481,594 B2
(45) Date of Patent: *Nov. 19, 2019

(54) CABLE PROCESSING MACHINE MONITORING WITH IMPROVED PRECISION MECHANISM FOR CABLE PROCESSING

(71) Applicant: SCHLEUNIGER HOLDING AG, Thun (CH)

(72) Inventors: Mustafa Ayabakan, Wuppertal (DE); Martin Stier, Werne (DE)

(73) Assignee: SCHLEUNIGER HOLDING AG, Thun (CH)

( * ) Notice: Subject to any disclaimer, the term of this patent is extended or adjusted under 35 U.S.C. 154(b) by 482 days.

This patent is subject to a terminal disclaimer.

(21) Appl. No.: 15/068,571

(22) Filed: Mar. 12, 2016

(65) Prior Publication Data

US 2016/0266576 A1 Sep. 15, 2016

(30) Foreign Application Priority Data

Mar. 12, 2015 (EP) .................................... 15158893

(51) Int. Cl.
*G05B 19/418* (2006.01)
*G05B 23/02* (2006.01)
*H02G 1/12* (2006.01)

(52) U.S. Cl.
CPC ....... *G05B 23/0216* (2013.01); *G05B 19/418* (2013.01); *G05B 2219/24086* (2013.01);
(Continued)

(58) Field of Classification Search
CPC .................................................. G05B 19/418
See application file for complete search history.

(56) References Cited

U.S. PATENT DOCUMENTS 6,718,624 B1 4/2004 Rohrbach et al.
6,941,248 B2 9/2005 Friedrich et al.
(Continued)

FOREIGN PATENT DOCUMENTS

DE 102007001266 A1 7/2008
DE 102007025796 A1 12/2008
(Continued)

OTHER PUBLICATIONS

EPO search report and written opinion from priority EPO application EP15158893, dated Oct. 1, 2015, in German.
(Continued)

*Primary Examiner* — Tejal Gami
(74) *Attorney, Agent, or Firm* — Davis & Bujold PLLC; Michael J. Bujold

(57) ABSTRACT

An intermediary system and processes for controlling cable processing on plural cable processing machines. The intermediary system receives operators' location data, as determined by location sensors; receives from each cable processing machine technical status data based on a physical parameter indicating a capability of the respective machine in executing a cable processing step; forwards an operator request to a wearable audio output device of an operator; and, receives from a particular machine's technical status update when capability for executing a particular cable processing step is restored. The intermediary system has a computing component including: technical status evaluator identifying, based on particular technical status data a need for restoring capability of the respective cable processing machine in executing a cable processing step; a request composition component generating the operator request with voice instructions for the operator, the operator request being based on the identified need, technical status data of other machines, and location data of the operators.

18 Claims, 7 Drawing Sheets

(52) U.S. Cl.
CPC ............ *G05B 2219/24094* (2013.01); *G05B 2219/31365* (2013.01); *G05B 2219/32226* (2013.01); *H02G 1/1248* (2013.01); *Y02P 90/30* (2015.11)

(56) References Cited

U.S. PATENT DOCUMENTS

| | | |
|---|---|---|
| 7,296,956 B2 | 11/2007 | Dirnfeldner |
| 2002/0046368 A1 | 4/2002 | Friedrich et al. |
| 2002/0067372 A1 | 6/2002 | Friedrich et al. |
| 2002/0069072 A1 | 6/2002 | Friedrich et al. |
| 2004/0046711 A1 | 3/2004 | Triebfuerst |
| 2004/0181935 A1 | 9/2004 | Rohrbach et al. |
| 2004/0255723 A1 | 12/2004 | Palmowski et al. |
| 2013/0125710 A1 | 5/2013 | Hombu |
| 2014/0025339 A1 | 1/2014 | McAdam et al. |
| 2014/0375799 A1 | 12/2014 | Probin et al. |

FOREIGN PATENT DOCUMENTS

| | | |
|---|---|---|
| WO | 00/62381 A1 | 10/2000 |
| WO | 2008/152551 A1 | 12/2008 |
| WO | 2014/147596 A1 | 9/2014 |

OTHER PUBLICATIONS

Copending commonly owned U.S. Appl. No. 15/068,563, filed Mar. 12, 2016.

Schleuniger Reference Manual 7.0 for PowerStrip 9550, p. 80, dated May 2014. [discussed at para[0072] of Applicant's disclosure].

CABLE PROCESSING MACHINE MONITORING WITH IMPROVED PRECISION MECHANISM FOR CABLE PROCESSING

This application claims benefit of priority to prior European (EPO) application no. EP15158893 filed on Mar. 12, 2015 and the entirety of prior European application no. EP1 51 58893 is hereby expressly incorporated herein by reference, in its entirety and as to all its parts, for all intents and purposes, as if set forth identically in full herein.

TECHNICAL FIELD

The present disclosure generally relates to cable processing machines, and more particularly, relates to improving the monitoring of such machines for improving cable processing precision of the cable processing machines.

BACKGROUND

Standard cable processing machines, hereinafter also referred to as machines, perform processing steps in the context of cable production. Multiple machines may be clustered in a machine center where multiple cable processing steps may be consecutively executed in an automated sequence. A machine center may also be considered to be a machine in the sense of the terminology and description within the present application. Typical examples for cable processing steps are: cutting cables at a desired length, removal of insulation at the cable ends (cable stripping), crimping of cable ends, etc. A machine may be equipped with one or more production tools to perform such a production step. For example, cable strippers may be used for removing insulation material from single wires, multi-conductor cables, or coax and optical fiber cables. An example of a cable stripper with rotative blades is disclosed in the published PCT application WO 2008/152551A1. It is also possible to cluster multiple tools in a machine center (e.g., a crimp center) where multiple production steps may be performed in an automated manner. For example, such an automatic machine or machine center may include respective production tools that are configured for cutting, stripping, crimping, sealing, twisting and tinning of cables. Standard cable processing machines and machine centers with the above described functions are commercially available from Schleuniger Group of Switzerland. Specific machines are disclosed at Schleuniger's Internet homepage at www.schleuniger.ch.

High precision of each production tool is required to ensure cable processing with correct length and correct insulation and robustness, etc. The precision of a cable processing machine is typically monitored through physical parameters that indicate the capability of the cable processing machine for cable processing steps. For example, the blades or knives of a stripping tool used for removing insulation material from cable ends may no longer be sharp enough to guarantee appropriate removal of the insulation (stripping). In such case, contact pressure between the blades or knives and cable insulation, as measured through appropriate sensors, may not be in a predefined range of tolerances that is however necessary to achieve the required precision. In this case, an operator is needed to resolve the issue and restore the machine's stripping capability for regaining the required precision. The term "operator" as used hereinafter refers to a resource for operating the cable processing machine. Operating in this sense includes but is not limited to providing maintenance activities and performing production support activities. An "operator" in the sense of this disclosure may be a living creature, such as a human operator, or a robot that may be voice controlled. However, operators may not be available in the vicinity of the cable processing machine and they may make errors during attending the machine, especially if they are not fully aware of what to do. This may result in a situation where a machine no longer has capability to produce high precision cables, until such capability is restored by an operator. Existing cable processing machines provide instructions to operators via displays. However, this requires an operator to be in the immediate vicinity of the machine so as to be notified and to execute the corresponding actions. There could be a negative impact on the quality of the performed actions, because the operator may not be able to simultaneously use eyes and hands for the parametrization of the machine which finally determines the precision of the cable processing steps.

SUMMARY

There is therefore a need to improve communication between cable processing machines and operators for reducing the time to restore the machine capability and resume cable processing with the required precision of the machine's production tools.

The above technical problem may be solved by versions within the scope of the present disclosure by providing and using a cable processing control intermediary system for controlling cable processing on a plurality of cable processing machines.

An exemplary intermediary system has an interface component that is configured to receive location data for a plurality of operators. The location data of each operator describes the physical location of the respective operator. Location data is determined by at least one location sensor. For example, operators may carry wearable devices that are configured to be sensed by other sensors such as RFID readers. In an alternative version, the wearable device itself may determine location data of the operator by sensors such as global or indoor positioning system (GPS, IPS) sensors. For example, commercially available indoor positioning systems (IPS) may be used, such as the IBEACON technology from Apple Inc., or IPS solutions using different technologies, including distance measurement to nearby anchor nodes (nodes with known positions, e.g., WiFi access points), magnetic positioning, dead reckoning. They can actively locate mobile devices and tags, or provide ambient location or environmental context for devices to get sensed.

The interface may further communicate with wearable devices of the operators by using an appropriate wireless communication standard (e.g., UMTS, Bluetooth, etc.).

The interface may further receive from each cable processing machine the technical status data of the respective cable processing machine. Thereby, the technical status data for each cable processing machine is based on at least one physical parameter indicating a capability of the respective cable processing machine for executing a cable processing step.

Typically, cable processing machines may receive or measure physical parameter values indicating their capabilities for executing particular cable processing steps. For example, such a physical parameter may be the contact pressure of the knives of a stripping tool, as mentioned above, or the contact pressure between transport rollers of a cutting tool and the to-be-transported cable, which is an important indicator for the precision of the capability to cut the cable with the correct cable length. Further physical parameters that may be measured by respective sensors shall be discussed in the following detailed description. A sensor for measuring the physical parameter value may be an integral part of the cable processing machine, or of the respective machine tool. The sensor may also be an integral part of a separate measuring device, in which case the machine may receive the sensed physical parameter values from outside the machine. For example, the physical parameter value may be received from an operator of the measuring device via voice instructions through a voice interface.

The intermediary system has computing apparatus (processor, memory) that are configured to implement a technical status evaluator that identifies, based on particular technical status data of a particular cable processing machine, a need for restoring a capability of that particular cable processing machine in executing a particular cable processing step. Further, a request composition component is implemented that is configured to generate an operator request with voice instructions for the particular operator. The operator request is based on the identified need, the technical status data of the other cable processing machines, and the location data for the plurality of operators.

In case the technical status data for a particular cable processing machine indicates a need for restoring a capability of this particular cable processing machine for executing a particular cable production step, the intermediary system generates the operator request for the particular operator and forwards the operator request to the particular operator. The particular operator is thereby determined based on the technical status of the at least one particular cable processing machine, the technical status of at least one further cable processing machine, and the location data. In other words, the current location of each operator, together with the technical status of the cable productions machines, are evaluated by the intermediary system, for example, by taking into account the priority of the various technical status data and the current locations of the respective operators.

For determining the particular operator out of the plurality of operators, the system may use a corresponding rule set of a proximity evaluator component. For example, a rule may determine the operator being closest to the particular machine, or the operator needing the shortest time to get to the particular machine.

In one version, the rules may take into account situations where operators are currently occupied by another machine and the intermediary system has an estimate of the time still to be spent with the other machine.

In one version, the rules may take into account how well the skill profile of the various operators matches the respective capability or technical status of the particular machine.

For identifying a need for restoring a capability of the particular cable processing machine, a technical status evaluator component is configured to analyze the particular technical status data of this particular cable processing machine in executing a particular cable processing step. Thereby, the technical status data may already include a capability indicator set by the particular machine, or the technical status data may include the respective physical parameter values of the machine, in which case the technical status evaluator includes the respective logic that is needed to derive the need for restoring the capability of the machine. For example, the technical status evaluator may be configured to determine, based on at least one physical parameter, that the capability that is characterized by the at least one physical parameter, is insufficient for executing a respective cable processing step by the respective machine. For example, for each physical parameter a data set may be stored that defines a tolerance range for the respective physical parameter. As long as the physical parameter lies within this tolerance range, the respective capability is sufficient to perform the production step. However, if the sensed physical parameter value falls outside the predefined tolerance range, the technical status evaluator determines that the respective capability is insufficient.

Once the need is identified and an appropriate operator for restoring the capability is determined, a request composition component of the intermediary system generates the operator request with voice instructions for the particular operator. The operator request is based on the identified need, the technical status data of the other cable processing machines, and the location data for the plurality of operators. In other words, the request composition component can compose a request including: an identifier of a wearable audio output device of the determined operator, and the corresponding voice instructions for the operator. The operator request is then forwarded to the respective wearable audio output device of the particular operator, and this operator now receives all instructions that are needed to restore the capability of the particular machine through his/her wearable audio output device.

In one version, the voice instructions may be received by the intermediary system from the machine itself.

In another version, they may be generated by a voice instruction generator of the intermediary system based on capability restoration data stored in the intermediary system or received from the particular machine. A voice instruction generator component of the intermediary system may generate voice instructions for the determined operator. The voice instructions are related to an action to be performed by the operator for restoring the capability of the cable processing machine, so as to enable the execution of the cable processing step. The voice instructions are configured for audio output generation on the particular wearable audio device associated with the operator. In one version, a data storage component of the intermediary system stores capability restoration data including technical instructions regarding the action to be performed by the human operator. The technical instructions are a basis for the generated voice instructions. For example, the capability restoration data may be configurable by a user. In other words, the capability restoration data provides the knowledge about how to restore the insufficient machine capability. This knowledge is communicated to the operator via the voice instructions. In one version, voice instruction files may be stored in a memory of the intermediary system. The files may be assembled according to the technical instructions of the capability restoration data, and then be transmitted to the wearable audio output device of the operator. In an alternative version, the voice instruction generator component may generate one or more text files including the voice instructions. The text files are transmitted to the wearable device, and a standard text-to-speech converter of the wearable audio output device transforms the text instructions into spoken natural language instructions.

Once the particular operator has completed the restoration of the capability of the particular cable processing machine, the intermediary system receives a technical status data update from the particular cable processing machine which indicates that the capability for executing the cable production step has been restored. After having received this technical status data update, the intermediary system knows that the particular operator is now available again for receiving new instructions.

It should be understood that the foregoing general description as well as the following detailed description are intended as exemplary and explanatory only, and are not intended as restrictive of the invention as described. Further advantages, features and details according to the present disclosure shall be apparent from the following description, in which some exemplary versions of the invention are described with reference to the drawings. Some exemplary possible realizations of systems, apparatus and method according to the present disclosure may be understood in greater detail on the basis of the attached drawings and accompanying description, without necessarily restricting the claimed scope of protection merely to specific exemplary disclosure. The figures are described in a cohesive and comprehensive manner, the same reference symbols denote the same components, and any reference symbols with different indices specify functionally identical or similar components.

DETAILED DESCRIPTION

In the present description, numerous specific details are set forth in order to provide a thorough understanding of exemplary versions of the present invention. It shall be apparent, however, to one skilled in the art, that some versions of the present invention may be practiced without some of these specific details. Indeed, reference in this specification to "one version," "a/the version," "one embodiment," "an/the embodiment," "a/the variant," and "one variant," should be understood to mean that a particular feature, structure, or characteristic described in connection with the version, variant, or embodiment is included in at least one such version, variant, or embodiment of the disclosure. Thus, the appearances of phrases "in one version," "in one embodiment", "in one variant," and the like in various places in the specification are not necessarily all referring to the same variant, version, or embodiment, nor are separate or alternative versions, variants or embodiments mutually exclusive of other versions, variants, or embodiments. Moreover, various features are described which may be exhibited by some versions, variants, or embodiments and not by others. Similarly, various requirements are described which may be requirements for some versions, variants, or embodiments but not others. Furthermore, as used throughout this specification, the terms 'a', 'an', 'at least' do not denote a limitation of quantity, but rather denote the presence of at least one of the referenced item in the sense that singular reference of an element does not necessarily exclude the plural reference of such elements. Concurrently, the term "a plurality" denotes the presence of more than one referenced items. Finally, the terms "connected" or "coupled" and related terms are used in an operational sense and are not necessarily limited to a direct connection or coupling.

Figure 1:
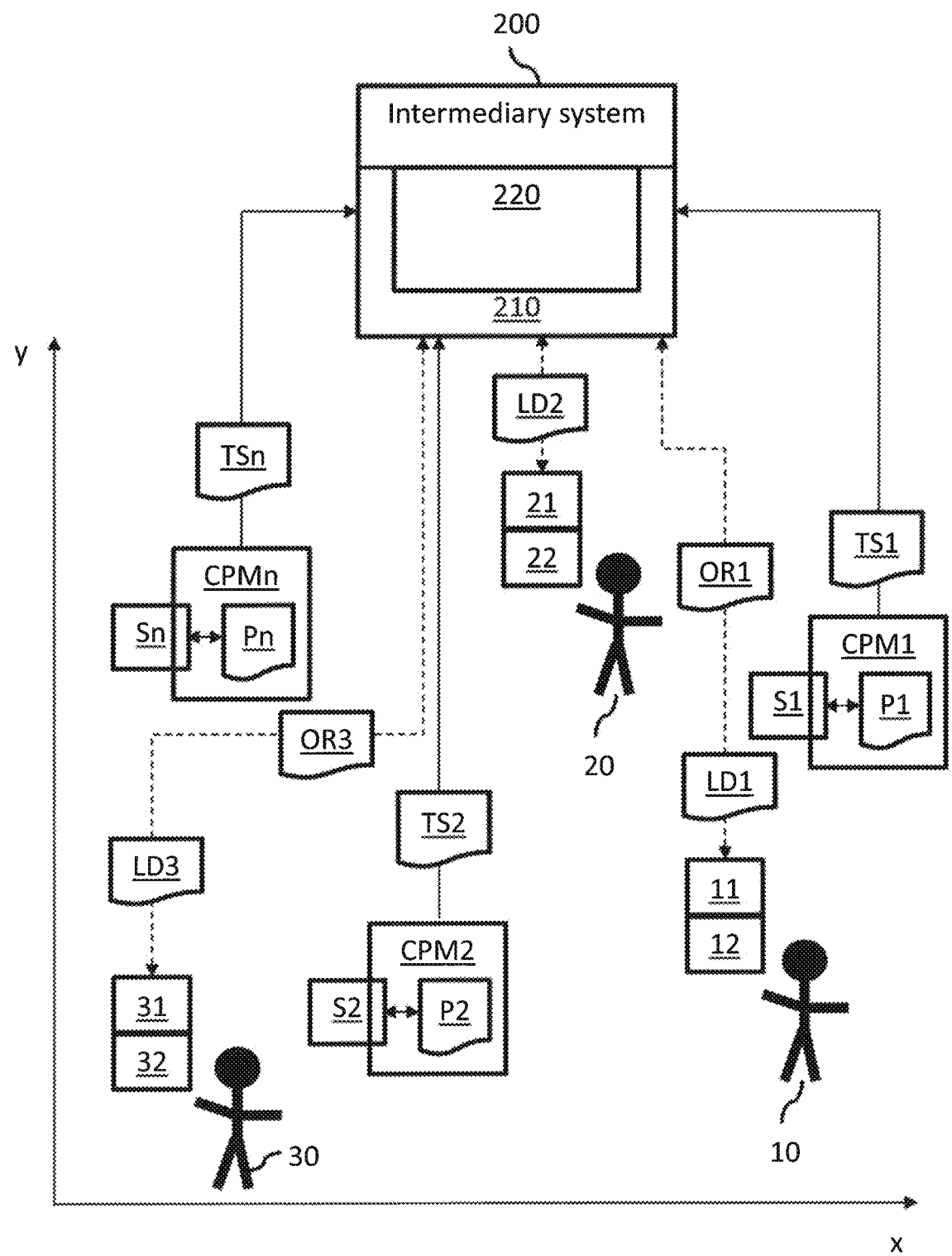
FIG. 1 is a simplified block diagram of a cable processing facility with a plurality of cable processing machines, a plurality of operators and an intermediary system according to a version within the scope of the present disclosure.

FIG. 1 is a simplified block diagram of a cable processing facility with a plurality of cable processing machines CPM1 to CPMn, a plurality of operators 10, 20, 30 and an intermediary system 200 according to a version within the scope of the present disclosure. Details of an exemplary cable processing machine are disclosed in FIG. 3.

The cable processing facility illustrated in FIG. 1 includes one or more cable processing machines CPM1 to CPMn. Each machine is placed at a physical location that may be represented by respective location coordinates (x,y). In the facility, or even outside the facility, one or more operators 10, 20, 30 are available for operating the machines. For example, an operator may be a human being skilled in in the operation and/or maintenance of such cable processing machines. Any other resource, for example robots, being able to perform such operating and/or maintenance activities is intended to be included in the meaning of the term "operator" within the context of the present disclosure. In the depicted example, operator 10 is currently physically located in the neighborhood of CPM1, operator 20 is currently located between CPM1 and CPMn, and operator 30 is close to CPM2. Further operators may be available, for example, in a break room or rest room outside the shown area where the cable processing machines are operated.

Each machine CPM1 to CPMn may receive, from one or more sensors S1 to Sn, at least one physical parameter P1, P2, Pn indicating a capability of the respective cable processing machine (CPM1 to CPMn) for executing a cable processing step. Examples of such physical parameters are disclosed in FIGS. 7-8. The physical parameters P1 to Pn reflect the technical status of each machine. For this purpose, each machine can monitor a plurality of physical parameters wherein the technical status with regards to one capability of the machine may be reflected by one or more physical parameters, and each machine may have one or more capabilities. The machines CPM1 to CPMn are communicatively coupled with an intermediary system 200. The intermediary system 200 may be located in the same area as the machines but it can be also placed anywhere else, such as for example in a dedicated server room or even in an external data center. The communication between the intermediary system 200 and the machines can be enabled by using any appropriate network technology such as well-known local area networks (LAN) or a wide-area network (WAN) like the Internet. The intermediary system has one or more interfaces 210 that are configured to enable communication with the machines CPM1 to CPMn as well as with the operators 10, 20, 30. The intermediary system 200 further has computing apparatus 220 with one or more processors and respective memory portions configured to process data received from the machines, sensors and/or the operators.

The intermediary system 200 receives from the cable processing machines CPM1 to CPMn the respective technical status data TS1 to TSn. Thereby, depending on the embodiment of the respective machine (see FIG. 3), the machine may simply send the one or more physical parameters reflecting its technical status, or the technical status data may already include an indicator regarding the capabilities of the respective machine. In other words, in a version, the machine may directly forward the sensed physical parameter values to the intermediary system for further processing and evaluation. In another version, the machine may pre-process the sensed physical parameter values and determine, on its own, if its capabilities are sufficient to execute the required cable processing steps. In this version, the technical status data TS1 to TSn sent by the machines may already include the information that, for example, a particular capability (e.g., the cable stripping or cable crimping capability) of the machine needs to be restored.

In the following description, an example scenario is used without any intention to limit the scope of claims to this scenario. A person skilled in the art may readily transfer the concepts underlying the following description subsequently to other scenarios involving, for example, other physical parameters or capabilities of cable processing machines.

In the example scenario, the machine CPM2 has sent technical status data TS2 to the intermediary system 200. The data TS2 indicated, at the time sent, that the cable stripping capability of CPM2 needed to be restored. In response, the intermediary system has assigned operator 30 to this task, and this assigned operator currently performs the corresponding maintenance activities at machine CPM2. This operator 30 has one or more wearable devices 31, 32. Such wearable devices may be separate devices or may be embodied in a single housing. In the following, the wearable devices are functionally distinguished into location sensors and audio output devices. Preferably, the wearable devices are hands-free devices, allowing the operator to perform actions employing both hands. For example, the wearable devices may be integrated into a headset of the respective operator.

One or more wearable location sensors can perform a location determination task (e.g., wearable device 31) to provide location data LD3 describing the physical location of the operator 30 to the intermediary system 200 via a wireless communication channel (illustrated by dashed line). For example, the location data LD3 of operator 30 is based on the physical location (x,y) of the operator wherein the location data (x,y) is determined by the one or more location sensors 32. For performing the maintenance activities at machine CPM2 the operator 30 is instructed by the intermediary system 200 through voice instructions that are sent to the respective wearable audio output device 31. The voice instructions may be included in the operator request OR3.

Further, in the example scenario, machine CPMn is working properly, and the technical status data TSn based on the one or more physical parameters Pn sensed by respective sensors Sn indicate that CPMn currently has all required capabilities to perform high precision cable processing steps.

Operators 10 and 20 are idle at the moment but continuously provide (e.g., at a predefined update rate) their respective location data LD1, LD2 determined by their respective location sensors 12, 22 to intermediary system 200. That is, the intermediary system is aware of the operators' approximate physical locations at any point in time. It is not necessary that the system know the exact physical locations at any point in time. The accuracy of the location data is sufficient if it is possible to distinguish the time or the path length it would take different operators to move from their current physical locations to a particular machine. For the communication with the intermediary system the operators 10, 20 use similar wearable devices (21, 22), (11, 12) to those of operator 30 supporting the location determination function for generating the location data LD1, LD2 and the voice instruction receiving function (audio output wearable devices 21, 11).

The machine CPM1 is sending its technical status data TS1 to the intermediary system 200. In the example, the technical status data TS1 includes the information that CPM1 is currently lacking its cable stripping capability. As described above, this information may already be explicitly included in the technical status data TS1 in case the machine CPM1 has a capability determination function. In case the machine only transmits the respective sensor data from sensor S1 including the physical parameter P1 values reflecting the cable stripping capability, the computing component 220 may evaluate the technical status data TS1 and derive the information that the cable stripping capability of CPM1 is currently unavailable.

In the example, the intermediary system 200 determines that operator 10 is the best fit for restoring the capability based on the location data LD1 received from the location sensor 11. (In the example, operators 10, 20 are already located in the proximity of CPM1, but operator 30 would need more time to move to CPM1.) Other information may be combined with the location data to identify the operator 10. Details of the operator determination method are disclosed in FIG. 2. The intermediary system 200 then sends a corresponding operator request OR1 to the wearable audio output device 11 of operator 10. This operator request OR1 may also be a sequence of requests including voice instructions instructing the operator how to restore the cable stripping capability CPM1. Once the capability is restored, CPM1 updates the technical status data TS1 to communicate the current technical status to the intermediary system.

Figure 2:
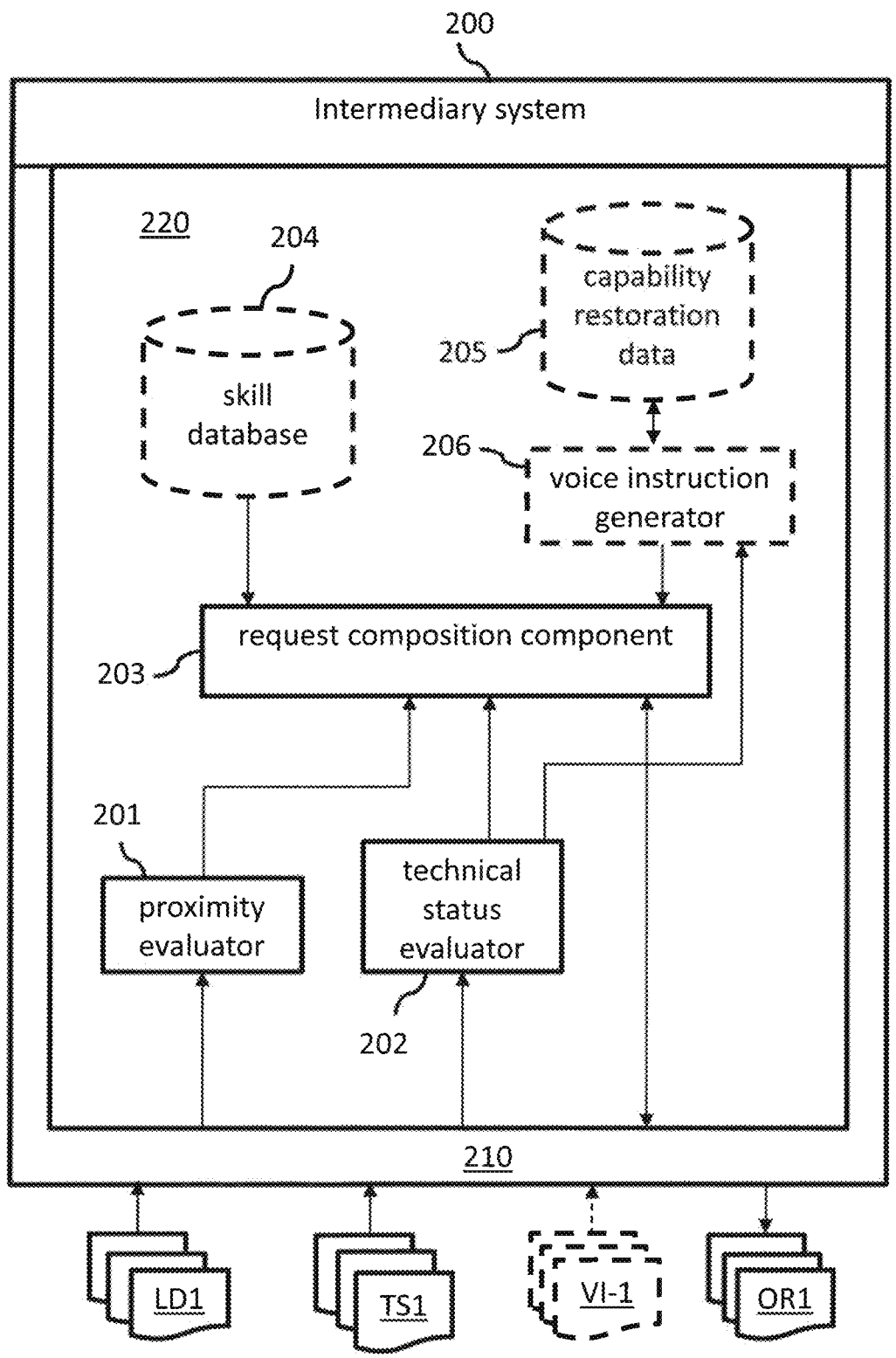
FIG. 2 is a simplified block diagram of an intermediary system according to a version within the scope of the present disclosure.
Figure 4:
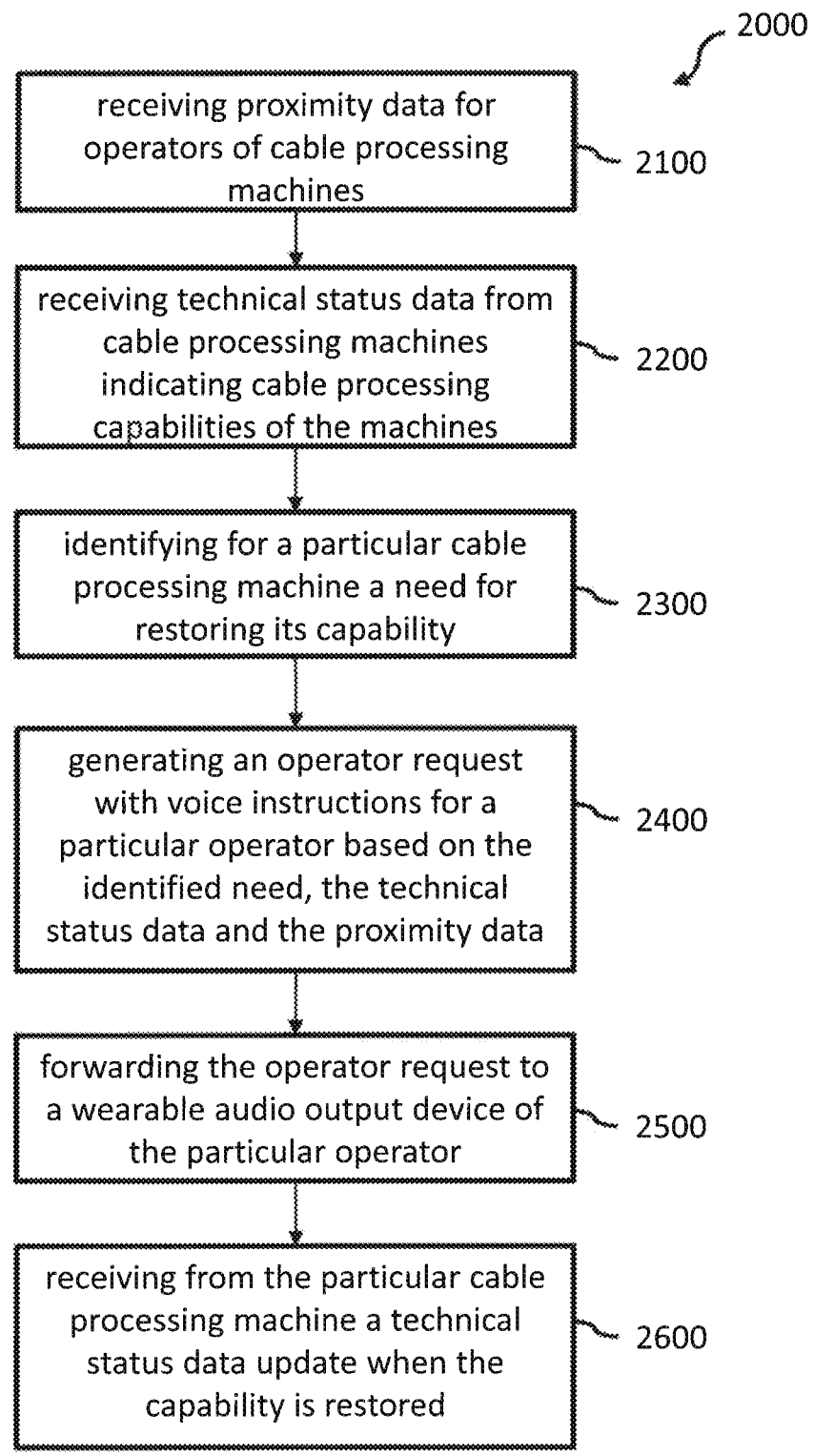
FIG. 4 is a flowchart of an exemplary method for controlling cable processing on a plurality of cable processing machines communicatively coupled via an intermediary system according to a version within the scope of the present disclosure.

FIG. 2 is a simplified block diagram of the intermediary system 200 according to a version within the scope of the present disclosure. Optional components are illustrated by dashed lines. The intermediary system 200 is configured to execute the method 2000 for controlling cable processing on the plurality of cable processing machines as illustrated by the simplified flow chart of FIG. 4. Therefore, the description of FIG. 2 will refer to the corresponding method steps as shown in FIG. 4.

The intermediary system has one or more interface components 210 for exchanging data with other entities. The interface 210 is configured to receive 2100 location data LD1, LD2, LD3 for the plurality of operators 10, 20, 30 wherein the location data of each operator is based on the physical location (x,y) of the respective operator. The location data (x,y) is determined by at least one location sensor 12, 22, 32 carried by the respective operator. For example, commercially available IPS solutions, such as the previously-mentioned IBEACON system, may be used for this purpose. IPS solutions can locate objects or people inside a building using radio waves, magnetic fields, acoustic signals, or other sensory information collected by mobile devices (e.g., wearable location sensors 12, 22, 32). Instead of using satellites as in GPS solutions, IPS solutions rely on different technologies, including distance measurement to nearby anchor nodes with known positions, for example WiFi access points; magnetic positioning; dead reckoning. They either actively locate mobile devices and tags, or provide ambient location or environmental context for devices to get sensed. System designs take into account that at least three independent measurements are needed to unambiguously find a location (trilateration).

The location data is then processed by a proximity evaluator component 201 of the intermediary system 200. The proximity evaluator 201 is configured to determine for the plurality of operators the current location of each operator. For example, the proximity evaluator 201 stores a map of the cable processing facility and other places where operators are available during their working hours. This map may include the location information of the technical equipment (CPM1 to CPMn) in the facility. When receiving the location data of the operators, the proximity evaluator may determine at any time which operator has which distance relative to any one of the machines. In other words, the proximity evaluator is aware at any time which operator may have the shortest or the fastest way to a particular machine. For example, a person skilled in the art knows how to design the proximity evaluator to determine a particular operator to be assigned to a particular machine by using shortest path analysis or the like.

The interface 210 is further configured to receive 2200 the technical status data TS1 to TSn sent by the machines CPM1 to CPMn. The computing component 220 implements a technical status evaluator component 202 configured to determine the technical status (i.e., the capabilities) of each of the machines, and to determine which of the machines will be attended next by an operator in case that one or more capabilities of one or more machines need to be restored.

For example, a machine priority ranking (e.g., a ranking table or ranking graph) assigns machine priority values to the various machines. A particular machine may have a higher machine priority than other machines because it performs a critical function within the plurality of machines. Each machine may have a different machine priority, or multiple machines may have the same machine priority. The technical status evaluator may further include a capability priority ranking that assigns capability priority values to the various processing capabilities. For example, cable stripping may have a higher capability priority than crimping. Other priority rankings may be defined by a person skilled in the art.

The technical status evaluator has a set of rules that allows determining a combined priority value for the received technical status data TS1 to TSn. In case of receiving multiple technical status data associated with multiple capabilities to be restored (e.g., on one or more machines), the technical status evaluator can take, based on the combined priority value, a decision regarding the order in which the capabilities will be restored.

Figure 3:
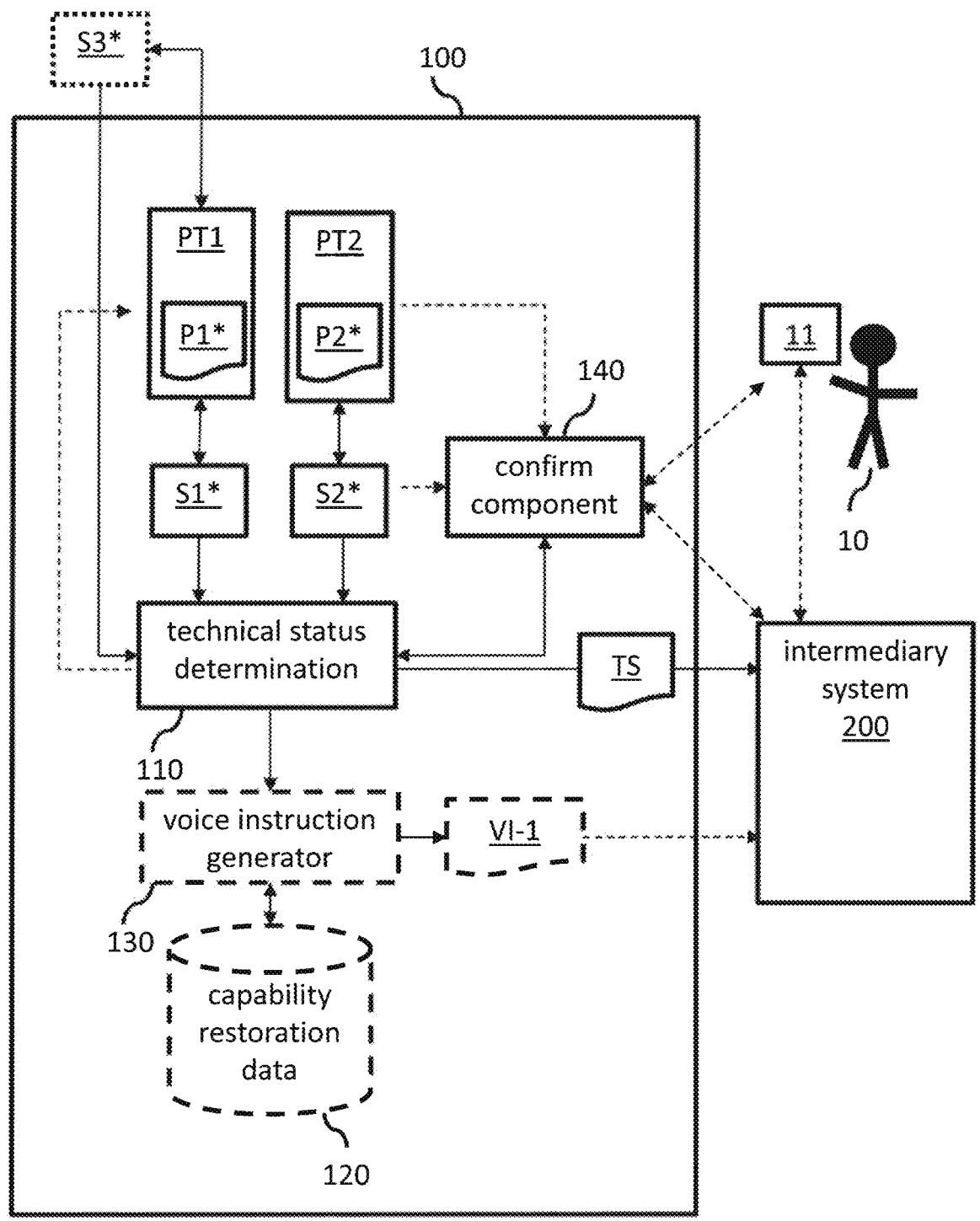
FIG. 3 is a simplified block diagram of a cable processing machine that is communicatively coupled with the intermediary system according to a version within the scope of the present disclosure.

Regarding the determination of the capability based on the physical parameters, in one version, the technical status evaluator may include a technical status or capability determination function as disclosed for the machine described in FIG. 3. In another version, such a machine may already send an explicit indicator for the capability as part of the technical status data. In this case, the technical status evaluator simply parses the technical status data to identify the respective capability indicator.

Once the technical status evaluator receives the technical status data TS1 from machine CPM1 it will determine one way or the other, that CPM1 is lacking its cable stripping capability and thereby identify 2300 that the particular cable processing machine CPM1 has a need for restoring its capability.

According to the example scenario, CPM2 also is lacking a capability but it is already taken care of by operator 30. CPMn is working properly. Therefore, the determined combined priority for the situation reflected by the technical status data TS1 (i.e., machine CPM1 lacks cable stripping capability) has the highest priority at the moment with regards to assigning an operator to CPM1 to restore the capability. As a consequence, this information is sent to the request composition component in order to generate 2400 a corresponding request for an appropriate operator. The request composition component 203 includes an operator determination function that can select a particular operator out of the pluralities of operators and assign this selected operator to the capability restoration task for CPM1. The operator determination function may, based on the result of the proximity evaluator 201, simply assign the operator who is closest to the machine CPM1 and who is not occupied with other activities at that time. In the example, operator 30 is not considered because of being occupied by machine CPM2. Operator 10 and operator 20 have about the same distance to CPM1. The operator determination function can select any one of those operators randomly or by a predefined ordering criterion (e.g., in alphabetical order of the operator's name).

In one version, the intermediary system may also include a skill database 204 for storing skill profiles of the various operators. For example, operator 20 may have a skill profile including crimping maintenance and cable feeder maintenance, while operator 10 may have a skill profile including cable stripping maintenance and cable crimping maintenance. The request composition component 203 can compare the capability needed to be restored with the skill profiles of the available operators. In the example, operator 10 is selected as the best fit with the capability (cable stripping is included in the operator's skill profile) and the operator request OR1 for operator 10 is composed accordingly. The operator request OR1 includes a destination which corresponds to the operator's wearable audio output device 11. For example, the destinations may be stored together with the operators' skill profiles, or stored separately in any appropriate data structure configured to store operator master data (for example: name, first name, employee number, etc.).

In one version, the request composition component may query the machine CPM1 to send the voice instructions VI-1 that need to be transmitted to the operator 10 with the operator request OR-1 for providing the instructions for restoring the capability in an audible format so that the operator may fully focus of the repair or maintenance work.

In one version, the intermediary system 200 further includes capability restoration data 205 that may be used by the voice instruction generator 206 to provide such voice instructions to the request composition component 203. The capability restoration data 205 and the voice instruction generator 206 components may be implemented in a similar way as the respective optional components 120, 130 of the machine 100 (see FIG. 3) and can be based on the result of the technical status evaluator to provide an action pattern for restoring the identified capability on the respective machine (e.g., CPM1). In one version, the skill database 204 may include information regarding the skill level of at least the selected operator. Based on this skill level, the voice instruction generator can provide voice instructions at different levels of granularity so that the voice instructions are adjusted to the operator's skill level accordingly.

The voice instructions can then be included in the operator request OR1. In case of a sequence of voice instructions for restoring the capability, a corresponding sequence of operator requests can be forwarded 2500 to the operator's wearable audio output device. For example, a first voice instruction to operator 10 can be: "Turn to machine CPM1". Once the operator confirms that he is now focusing on machine CPM1 the voice instructions guiding the operator through the capability restoration process can be similar to the voice instructions included in the action pattern shown in FIG. 5. At the end of this process, the machine CPM1 recognizes that its cable stripping capability has been restored and sends a corresponding technical status data update to the intermediary system 200. After having received 2600 the technical status update, the intermediary system 200 can reassign the operator 10 for other capability restoring activities.

FIG. 3 is a simplified block diagram of a cable processing machine 100 according to a version within the scope of the present disclosure. The machine 100 has one or more cable processing tools PT1, PT2. Examples of the tools of the machine 100 can be: a cable feeding unit, a cable straightening unit, a cable cutting unit, a cable stripping unit, a cable crimping unit, or any other tool configured to perform one or more particular cable processing steps in a cable production process. A person skilled in the art of cable processing machines knows the various functions and aspects very well, as they can be found in commercially available cable processing machines. In the following example it is assumed that PT1 is a cable stripping unit and PT2 is a cable crimping unit. However, the teaching of the present disclosure can be readily applied by a person skilled in the art to any other tool of the machine 100.

The function and/or precision of the various processing tools (e.g., stripping unit PT1, crimping unit PT2) can be monitored by appropriate sensors S1*, S2*, S3* that may be integrated in the machine 100 or that may be provided by external measurement devices. Such sensors are set up to measure physical parameters indicating capabilities of the respective cable processing tools for executing respective cable processing steps.

For controlling and monitoring the technical functioning of the machine 100, the machine further has a memory that is configured to store data and/or instructions executable by one or more processors of the machine 100. In one version, the instructions when being executed by the processor(s) implement a technical status determination component 110, a voice instruction generator component 130, a capability restoration data storage component 120, a confirm component 140 as a well as appropriate interface components configured to enable communication between the various components of the machine 100 and between the machine 100 and the operator 10 (directly or through further communication systems, such as through audio output device 11). The voice instruction generator 130 and the capability restoration data component 120 are optional and may also be implemented at the intermediary system 200 as disclosed above.

The functions of the machine 100 shall now be explained in detail including the optional components (illustrated by dashed lines). The person skilled in the art can transfer the knowledge about the functioning of the voice instruction generator 130 and capability restoration data components 120 for implementing those functions at the intermediary system level.

The sensors S1*, S2*, S3* are used to measure or sense physical parameters P1*, P2* indicating the capabilities of the respective cable processing tools PT1, PT2 for executing respective cable processing steps. In other words, the sensors may be used for a continuous monitoring of the machine tools with regards to their proper functioning in the cable processing process. For example, in case of the stripping tool PT1, the physical parameter P1 may be monitored as an indicator for the strip quality of the stripping tool PT1. The respective measurement method is disclosed in the published PCT application WO 2014/147596A1. A device is disclosed that can detect the contact of the blades of the stripping tool with the electrical conductor parts of the processed cable enclosed by an electrical insulation. A thin electrical insulation is provided between the tool and a tool retainer such that the components form a capacitor together with the coaxial cable. An inductor is connected in parallel therewith, such that an LC oscillating circuit of high quality is formed between the tool and the tool retainer. The electronic circuit assembly excites the oscillating circuit and determines characteristic oscillation parameters of said oscillating circuit. Furthermore, for the cable processing, tool/conductor contacts may be weighted in dependence on contact duration and point in time within the cable-processing process, and thus quantitative production rejection criteria can be determined. For example, the capacitive measurement of the physical contact parameter P1* by the sensor S1 can be performed fully automatically on board of the cable processing machine, and can reflect the technical status of the stripping tool in terms of a sufficient stripping quality. In case of contact detection, the blades have gone too deep and may have hurt the conducting parts of the cable (e.g., one of the strands of the cable). This imprecision of the tool bears the risk that the processed cable will not be usable.

Figure 8:
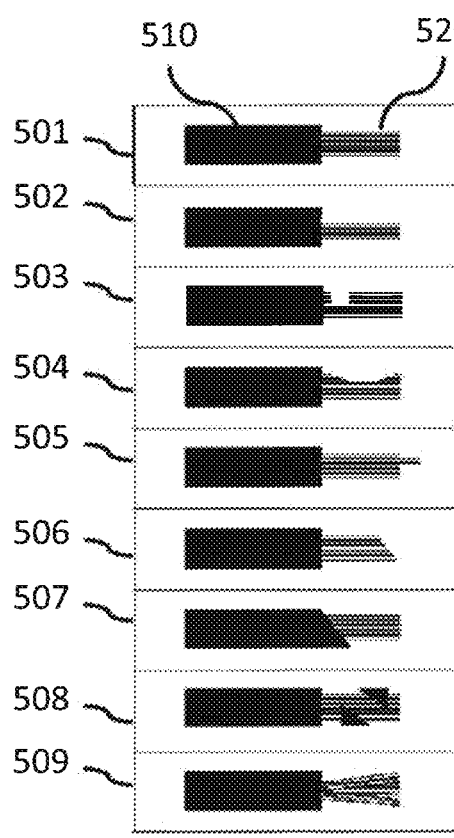
FIG. 8 illustrates the technical status indicator "strip quality".

Turning briefly to FIG. 8, an overview of possible stripping results 501 to 509 is given. 501 is a good strip result where the insulation material 510 is correctly removed from the cable end (over the correct length) and all conductive strands 520 of the cable are preserved as required. 502 is a stripping result where the blades have cut too deep cutting some strands which are now missing. This may result in bad conductivity, high resistance, weak/low mechanical robustness, etc. 503 and 504 show two scenarios where strands are notched or scratched, respectively. 505 and 506 show stripped cables with pulled strands and angled cut of strands resulting in a poorly defined cable length. Stripping result 507 shows an angled cut of insulation indicating that the positioning of the blades is incorrect. Stripping result 508 illustrates bad stripping quality because of insulation residues left on the strands. 509 shows spread strands. At least the stripping results 502, 503 and 504 would be identified by the contact detection sensor clearly indicating that the capability of the stripping unit for the cable stripping step is insufficient.

Back to FIG. 3, a further sensor S3* could complement the contact detection sensing, for example, with a visual inspection. For example, S3* can be a camera sensor coupled with an image processing device which is configured to recognize insufficient stripping results 505 to 509. S3* may be also an integral part of the machine 100. However, in general, sensors S1* to S3* may also be mounted on measurement devices external to the machine 100. In such a case, an operator may perform the capability checks on such measurement devices. The results may then be provided to the machine either by the sensors directly, or through interaction with the operator.

Figure 7:
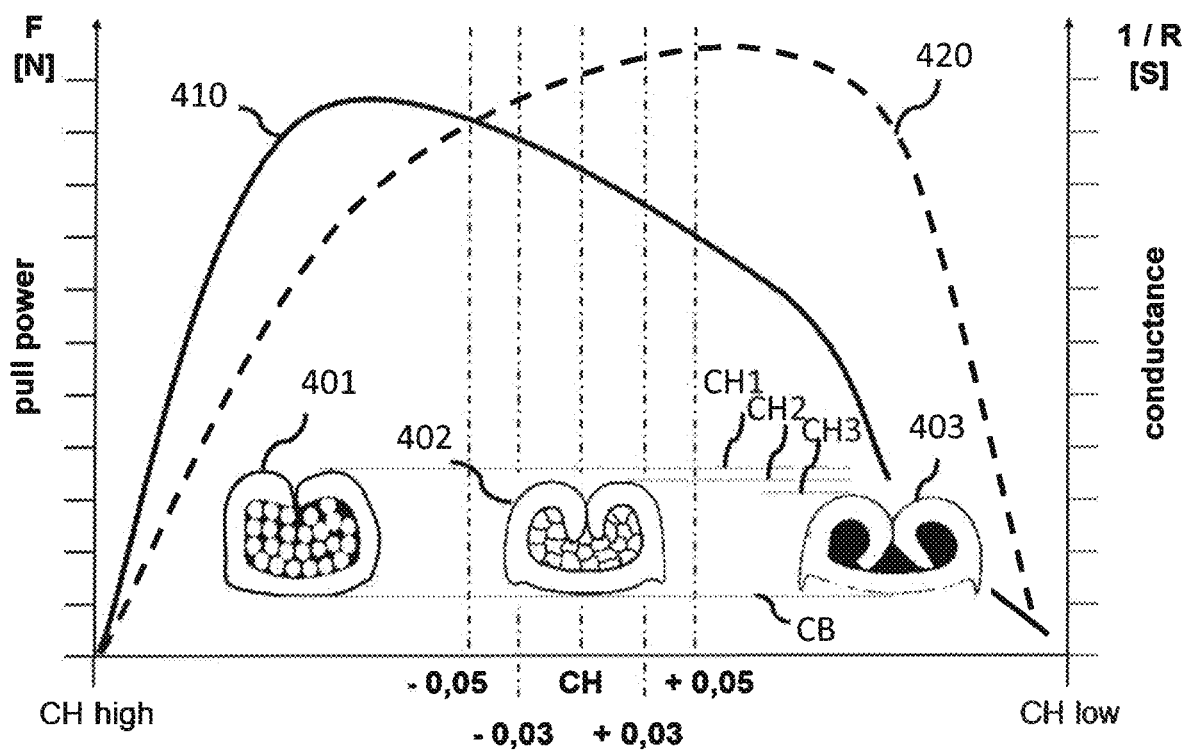
FIG. 7 illustrates the technical status parameter "crimp height"

Turning briefly to FIG. 7, a further example for a technical parameter is explained. FIG. 4 relates to the physical parameter P2* associated with the crimping tool PT2 which can be measured by sensor S2*. The physical parameter P2* used in the example is the so-called crimping height CH of a crimp measured in relation to the crimping base CB. An ideal crimping result 402 with a crimping height CH2 is shown in the middle of FIG. 7. The ends of the crimp are sufficiently bent inwards and the power curve 410 (pull power) as well as the conductance curve 420 (1/R) is inside a well acceptable tolerance range. Regarding the crimp result 401 on the left, the crimping was not strong enough and the crimp is not tight enough also resulting in a poor conductance value. This is reflected by the corresponding crimping height CH1. Regarding the crimp result 403 on the right, the crimping was too strong and the conductance has suffered severely, which is reflected by the crimping height CH3. That is, a measured crimping height which is outside the tolerance range (e.g., dashed lines +/−3% around the ideal crimping height) CH2 indicates that the crimping capability of the crimping tool PT2 is insufficient and needs attention for readjustment. Of course, the tolerance range may depend on the precision requirements of the processed cables. This is illustrated by a second example tolerance range (dashed lines +/−5% around the ideal crimping height) CH2.

Turning back to FIG. 3, the sensed physical parameter values P1*, P2* reflecting the technical status of the stripping and crimping tools PT1, PT2 can be provided by the respective sensors S1*, S2* (and optionally S3*) to the technical status determination component 110. In one embodiment, technical status determination component 110 can implement a capability determination function which can then determine whether the capability of the respective processing tool is sufficient or insufficient for executing the corresponding cable processing step. In one embodiment, the capability determination component can store the tolerance ranges of the physical parameters associated with the various cable processing tools used by the cable processing machine 100. As long as the sensed values are in predefined tolerance ranges, the values are continuously monitored and cable processing continues. When a sensor (S1 to S3) provides a measured physical parameter value P1, P2 being outside the respective tolerance range of the corresponding processing tool PT1, PT2 the capability determination function can determine that the capability of the said processing tool PT1, PT2 is insufficient to perform the cable processing step with adequate precision. As a consequence, the cable processing is interrupted at the corresponding processing tool. For example, if an electric contact between the stripper blades and the cable strands is detected, the stripping tool is stopped. For example, if the measured crimping height is outside the tolerance range for good crimping results, the crimping tool is stopped.

The person skilled in the art can define appropriate technical parameters reflecting the capability of other cable processing tools used by the cable processing machine, and set tolerance ranges accordingly which can then be used by the capability determination function. In such versions, where the capability determination function is implemented by the intermediary system, the technical status determination component 110 can forward the monitored physical parameters P1*, P2* to the intermediary system 200 where the capability determination function can be performed accordingly.

In one version, that may be combined with other disclosed versions, the physical parameter can be the elapsed processing time of a processing tool since the last setup, or the number of processing steps performed since the last setup. In this embodiment, the sensor may be a simple time-taker or counter to measure the elapsed processing time or the number of performed processing steps. The tolerance range in this version may simply be defined by a threshold value for the elapsed time or the performed number of steps. Once the threshold value is reached, the corresponding processing tool of the machine 100 is stopped because it is assumed that the capability of the tool may need to be restored.

In one version, a sensor recognizes that the to-be-processed cable has been changed. This may trigger a stop of all cable processing tools because of the underlying assumption that capabilities of the processing tools were adjusted to the previously processed cable, and need now to be readjusted for the new cable material.

Once the capability determination function has identified a need for restoring at least one of the machine's capabilities which needs the attention of an operator 10, the voice instruction generator component 130 may generate voice instructions VI-1 for the operator 10, wherein the voice instructions are related to a particular action to be performed by the operator for restoring capability of the cable processing machine. The voice instructions may be based on respective capability restoration data 120 stored in the memory of the machine 100, and are configured for audio output generation on a particular wearable audio output device 11 associated with the operator 10. The operator can confirm this instruction (OK). Confirmation can occur in any appropriate manner like for example, using voice control via an appropriate voice recognition unit of the machine 100, a keyboard entry, a mouse click, a gesture recognition user interface, etc.

In one version, the voice instructions VI-1 may be assembled by the generator 130 in a text format file that is to be sent to the wearable audio output device and to be converted into natural spoken language by a standard text-to-speech converter running on the wearable device. In an alternative version, the voice instructions may be assembled by the generator 130 based on predefined audio snippets into an audio file that is immediately playable by a standard media player of the wearable audio output device 11. The terminology "audio snippets" as used herein is defined to mean short audio or sound files with spoken words that may be concatenated to result in said voice instructions.

The capability restoration data 120 includes the data needed by the generator 130 to generate the voice instructions in response to an identified capability gap of any one of the processing tools. For example, the capability restoration data can include a mapping data structure (e.g. a table, an XML file, an ontology, pointer structures, etc.) to define for each capability gap a corresponding workflow or action pattern that describes the action to be performed by the operator in order to restore the respective capability. Any appropriate format for such a description may be used (e.g., a graph, a flow chart, a table, etc.). In other words, for each sensed physical parameter value (reflecting a capability of a cable processing tool) which is outside its respective tolerance range, a corresponding description of the action to be performed by the operator is stored in the capability restoration data 120. It is possible to provide an appropriate user interface enabling a user to modify existing action patterns or create new action pattern for particular capability restorations. Once the capability gap is identified by the determination function, the voice instruction generator 130 can retrieve the corresponding workflow or action pattern from the capability restoration data 120 and assemble the voice instructions accordingly. The generated voice instruction data VI-1 can then be sent to the intermediary system to be forwarded to the wearable audio output device of the selected operator.

In versions, where the voice instruction generator and the capability restoration data components are implemented by the intermediary system, only the technical status data TS is sent to the intermediary system. The voice instructions are generated by the intermediary system in a similar way as by the optional embodiment of the cable processing machine 100.

Figure 5:
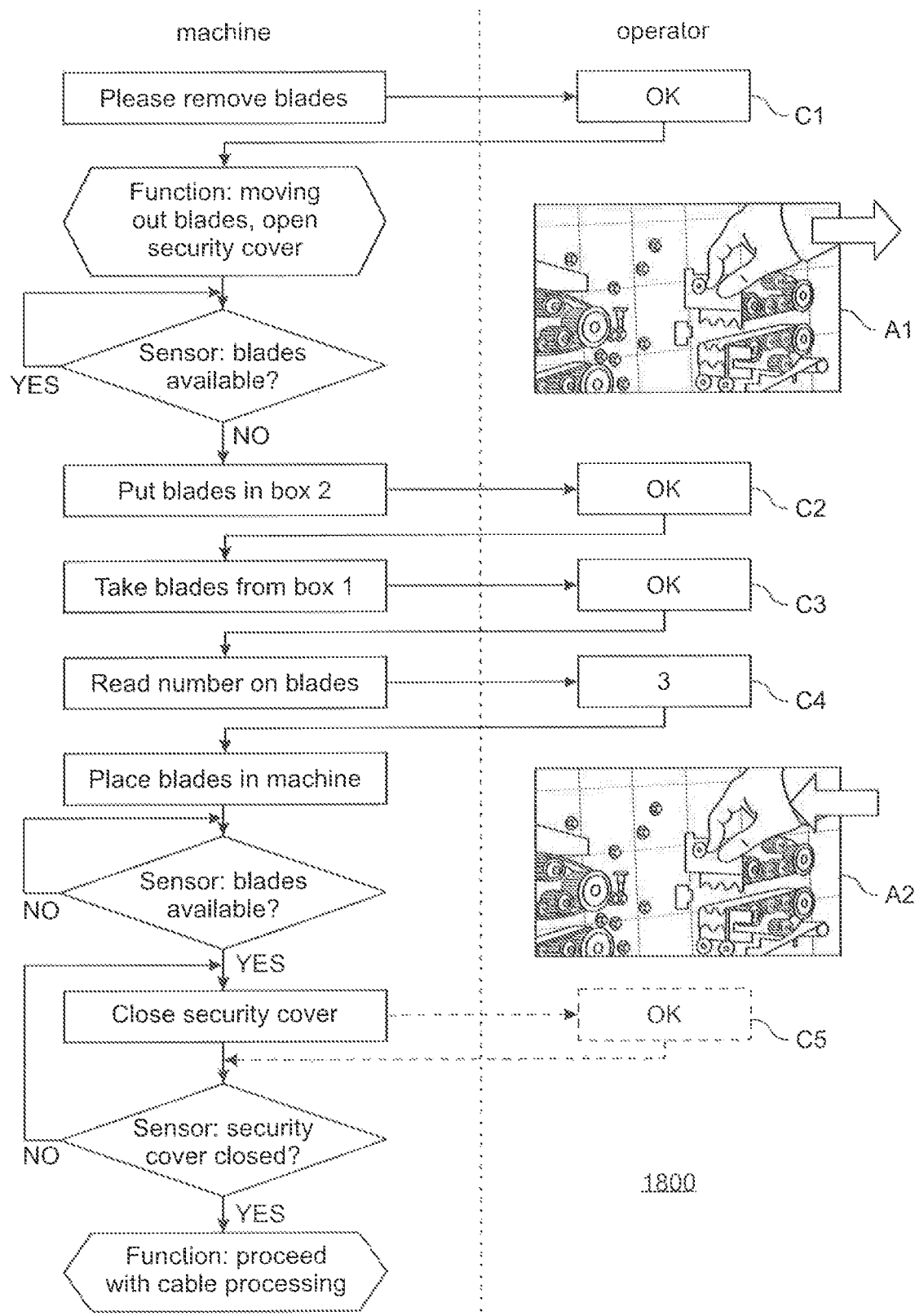
FIG. 5 is an example of a machine-operator dialogue using voice instructions.

Turning briefly to FIG. 5, an example is given for an action pattern 1800 that is associated with a capability gap of the stripping unit. It is assumed that the monitoring of the corresponding physical parameters has detected an insufficient capability regarding the technical status of the blades for the removal of the insulation, and that the machine has already stopped the stripping tool PT1.

In prior art solutions, the operator would perform the respective actions by using a manual, such as for example, the Schleuniger Reference Manual, Edition 7.0 (05-2014) PowerStrip 9550, page 80. Such a manual can be made available in paper or in digital format. In both cases, the attention of the operator is at least partially directed to the manual, instead of directed fully to the machine. Versions within the scope of the present disclosure may instruct the operator via voice instructions so that the operator can fully focus on the maintenance activities without a need for a visual manual at all. Further, the level of detail in the voice instructions may be adjusted to the skill level of the operator. For highly skilled operators, a reduced set of voice instructions may be sufficient, also reducing the number of confirmations required from the operator and, as a consequence, the overall time for restoring the machine's capability. On the other hand, if an operator with a lower skill level is instructed, a more detailed action pattern may be employed dependent on the skill level of the operator. A more detailed action pattern may include voice instructions that have a work instruction granularity similar to the one shown in the above reference manual (e.g., instructions for loosening screws, etc.).

According to a version within the scope of the present disclosure, the voice instruction generator 130, 206 identifies the corresponding action pattern 1800 for changing the stripping blades via the mapping structure in the capability restoration data 120. The example action pattern 1800 of FIG. 5 depicts the voice instructions of the machine 100 for the operator on the left hand side as rectangle boxes, and the expected operator responses on the right hand side as rectangle boxes. Each rectangle on the machine side may be subject to text-to-speech generation, or may be associated with a predefined audio snippet. The example action pattern in FIG. 5 may be appropriate for an operator with a relatively high skill level because the granularity of the voice instructions is rather low (not many details are included in the instructions). Further instruction patterns may be stored adapted for other skill levels. The appropriate action pattern may be selected in accordance with the skill level of the selected operator, which may be available in the skill database 204 (see FIG. 2).

Figure 6:
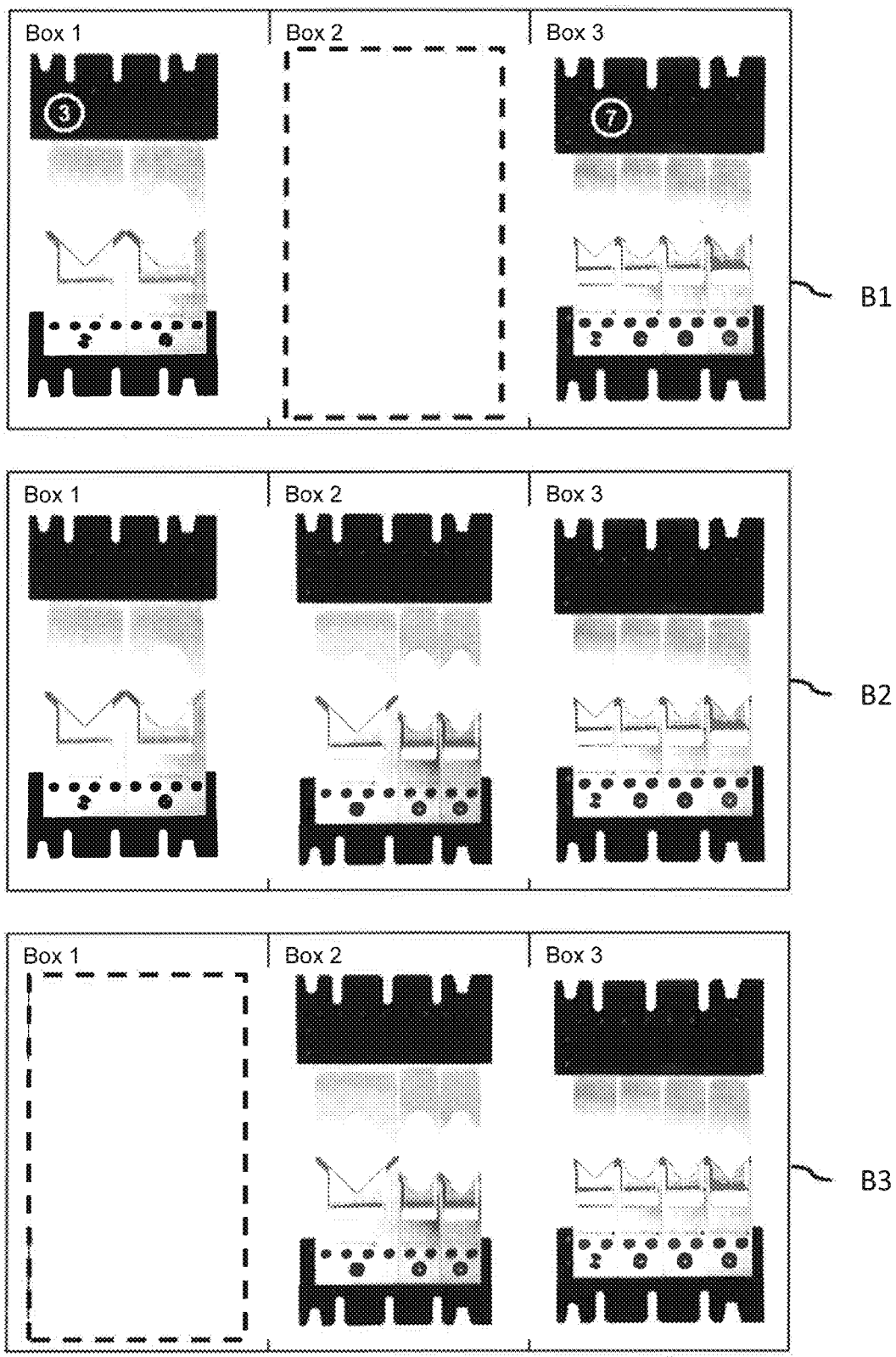
FIG. 6 illustrates the status of blade boxes during blade change actions.

Once the stripping tool has been stopped, the first voice instruction "Please remove blades" is sent 1400 to the wearable audio output device of the operator. The operator can confirm the instructions with "OK" C1. Then the machine 100 automatically moves out the used blades and automatically opens the security cover of the machine. The result of this step is illustrated by the picture A1. Sensors can recognize whether the blades are already taken by the operator or whether they are still available in the machine. As soon as the sensor recognizes that the blades are removed by the operator, the next voice instruction "Put blades in box 2" is generated and sent to the wearable audio output device. FIG. 6 illustrates the status B1, B2, B3 of boxes box 1, box 2 and box 3 during the blade change actions. Initially (status B1) box 2 is empty. Status B2 shows the status after the operator has put the used blades into box 2. Once confirmed C2 by the operator, the next instruction is generated and sent: "Take blades from box 1". The status B3 in FIG. 6 illustrates the result with an empty box 1 after the operator has followed the instructions. Once confirmed C3 the operator is further instructed: "Read number on blades". In response to the confirmation C4 ("3") by the operator the next voice instruction "Place blades in machine" is generated and sent. When the machine senses that the new blades are available, it generates the instruction "close security cover". The situation after the blades have been placed in the machine is illustrated by the picture A2. In this case the OK-confirmation C5 of the operator is optional because internal sensors can automatically determine the technical status of the security cover. Only if the cover is closed accordingly may the stripping tool resume cable stripping. Different types of blades as used in the boxes of FIG. 4 are described in the above mentioned Schleuniger Reference Manual, for example, on page 57.

The closing of the security cover in the scenario of FIG. 5 can be seen as the final confirmation received by the confirm component 140 that the capability of the stripping tool is fully restored and that the machine can continue with the execution of the respective cable processing steps. As illustrated by the example of FIG. 5, the sending voice instructions and receiving confirmation steps may correspond to a whole series of sending and receiving steps, wherein each sending step provides voice instructions related to a particular part of the action pattern which needs to be performed by the operator, and wherein the corresponding receiving confirmation steps confirm the completion of the particular part by the operator. In other words, the sending voice instructions and receiving confirmation steps are iteratively repeated until all corresponding parts of the corresponding action pattern were processed by the voice instruction generator 130, 206 and confirm components 140 accordingly, and a final confirmation about the completion of the entire "restoring capability" action is received by the confirmation component.

In one version, the confirm component may receive confirm commands directly from the operator. In another embodiment, the wearable audio output device 11 of the operator 10 may include an audio input function (e.g., a headset) that communicates the commands to the intermediary system 200 from where they can be received by the confirm component 140.

In the example, a final confirmation from the operator (optional OK box) was received. This optional confirmation is complemented in the example by a confirmation signal received from sensors of the machine confirming the closing of the security cover. This indicates that the entire action for restoring the stripping capability is completed.

The machine 100, or, depending on the version, the intermediary system 200, may then validate this confirmation, and checks if the capability is really restored. In the example, for this purpose, the sensors for checking the availability of the blades in the machine may be used. If the sensor data confirm that the blades are available in the machine, and that the security cover is closed, then the validation is successful. The machine has now proven, that the capability of the stripping tool is restored, and proceeds with executing the cable processing step cable stripping.

It merits attention to also explain some optional versions. As illustrated in FIG. 3 by dashed arrows, the confirm component 140 may receive confirmation from various sources. As depicted by the example, the operator may provide direct confirmation feedback either through his wearable device, or using any other appropriate human machine interaction interface. The confirmation may also be received from any sensor inside or outside the machine 100, or it may be provided by the respective processing tool itself.

Regarding the capability validation step, the capability determination function may also require a test measurement of the respective physical parameters before releasing the machine for execution of a regular cable processing step. For example, after the change of the blades, the sensors for detecting the electrical contact between the new blades and the cable strands may provide or prove that the capability for removing insulation without hurting the cable is restored. The person skilled in the art can define which physical parameter values need to be checked for validating restored capability of other processing tools. Those parameters include, but are not limited to: closure size of a straightener tool, gripper pressure of a gripper tool, strip quality achieved by a stripping tool, crimp height achieved by a crimp tool.

Method steps may be performed by one or more programmable processors executing a computer program to perform functions described within the scope of the present disclosure, by operating on input data and generating output. Method steps may also be performed by, and apparatus within the scope of the present disclosure may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory, or both. The essential elements of a computer are at least one processor for executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. Such storage devices may also provisioned on demand and be accessible through the Internet (Cloud Computing). Information carriers suitable for embodying computer program instructions and data include all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in special purpose logic circuitry.

In order to provide for interaction with an operator, there may be implementation on a cable processing machine or machine center having input/output apparatus, such as a display device, for example, a cathode ray tube (CRT) or liquid crystal display (LCD) monitor, for displaying information to the user; and an input device such as a keyboard, touchscreen or touchpad, a pointing device, for example, a mouse or a trackball, by which the user may provide input to the computer. Other kinds of devices may be used to provide for interaction with a user as well. For example, feedback provided to the user may be any form of sensory feedback, as for example, visual feedback, auditory feedback, or tactile feedback; and input from the user may be received in any form, including acoustic, speech, tactile or visual (for example, gaze control or the like) input.

Implementations within the scope of the present disclosure may be implemented in a cable processing machine with a computing component that includes a back-end component, for example, as a data server, or that includes a middleware component, for example, an application server, or that includes a front-end component, for example, a client computer having a graphical user interface or a Web browser through which a user may interact with an implementation, or any combination of such back-end, middleware, or front-end components. Client computers may also be mobile or wearable devices, such as smartphones, tablet PCs or any other handheld computing device. The components of the system may be interconnected by any form or medium of digital data communication, for example, a communication network. Examples of communication networks include a local area network (LAN) and a wide area network (WAN), for example, the Internet or wireless LAN or telecommunication networks.

A network may include clients and servers. A client and server are generally remote from each other and typically interact through a communication network. The relationship of client and server arises by virtue of computer programs running on the respective computers and having a client-server relationship to each other.

Finally, it should be noted that the term "comprising" does not exclude other elements or features, and that use of the terms "a" or "an" does not necessarily exclude a plurality, in the sense that singular reference of an element does not exclude the plural reference of such elements. The verb 'comprise' and its conjugations do not exclude the presence of elements or steps other than those listed in any claim or the specification as a whole. The mere fact that certain features may be recited in mutually different dependent claims does not necessarily indicate that a combination of these features cannot possibly be used to advantage. Furthermore, features described in association with different versions may possibly be combined. It should be noted that the above-mentioned examples, and versions illustrate rather than limit the invention, and that those skilled in the art will be capable of designing alternative implementations without departing from the scope of the invention as defined by the appended claims. As equivalent elements may be substituted for elements employed in claimed invention to obtain substantially the same results in substantially the same way, the scope of the present invention is defined by the appended claims, including known equivalents and unforeseeable equivalents at the time of filing of the present application. Thus, in closing, it should be noted that the invention is not limited to the abovementioned versions and exemplary working examples. Further developments, modifications and combinations are also within the scope of the appended patent claims and are placed in the possession of the person skilled in the art from the present disclosure. Accordingly, the techniques, systems, and structures described and illustrated previously herein should be understood to be illustrative and exemplary, and not necessarily limiting upon the scope.

What is claimed is:
1. A cable processing control intermediary system (200) for controlling cable processing of a plurality of cable processing machines (CPM1 to CPMn), the cable processing control intermediary system (200) comprising:
an electronic interface component (210) being digitally connected for communicating with the cable processing control intermediary system (200) solely by digital data communication, and the interface component (210) being configured to:
digitally receive location data (LD1, LD2, LD3) for a plurality of operators (10, 20, 30), wherein the location data of each operator describes a physical location (x, y) of the respective operator, and the location data determined by at least one location sensor (12, 22, 32);
digitally receive from each cable processing machine (CPM1 to CPMn) technical status data (TS1 to TSn) of the respective cable processing machine, wherein the technical status data for each cable processing machine is based on at least one physical parameter (P1, P2, Pn) indicating a capability of the respective cable processing machine (CPM1 to CPMn) for executing a cable processing step;
digitally forward an operator request (OR1) to a wearable audio output device (11) of a particular operator (10), and the particular operator (10) being one of the plurality of operators (10, 20, 30) for which location data (LD1, LD2, LD3) was received by the interface component (210);
digitally receive from a particular cable processing machine (CPM1) a technical status data update once a particular capability for executing a particular cable processing step is restored; and
at least one computing component (220) being digitally connected to the interface component (210), the at least one computing component (220) comprising:
a technical status evaluator (202) configured to identify, based on particular technical status data (TS1) of a particular cable processing machine (CPM1) a need for restoring the particular capability of the particular cable processing machine (CPM1) for executing the particular cable processing step; and
a request composition component (203) configured to generate the operator request (OR1) with voice instructions (VI-1) for the particular operator (10), the operator request (OR1) based on the identified need, the technical status data (TS2 to TSn) of the other cable processing machines (CPM2 to CPMn), and the location data (LD1, LD2, LD3) for the plurality of operators (10, 20, 30),
wherein the technical status evaluator (202) has a set of rules configured to determine a priority value for the received technical status data (TS1 to Tsn), and a highest priority is determined by the technical status evaluator based upon at least 1) a priority of the cable processing machine (CPM2 to CPMn) in need for restoring the particular capability, and 2) a skill profile of the plurality of operators (10, 20, 30) stored in a skill database (204).

2. The intermediary system (200) of claim 1, wherein the at least one physical parameter value is selected from the group of:
closure size of a straightener tool,
gripper pressure of a gripper tool,
strip quality achieved by a stripping tool, and
crimp height achieved by a crimp tool.

3. The intermediary system (200) of claim 1, wherein the location sensors are part of an indoor positioning system based on a technology selected from the group of:
distance measurement to nearby anchor nodes,
magnetic positioning, and
dead reckoning.

4. The intermediary system (200) of claim 1, further comprising:
a proximity evaluator component (201) configured to store:
a map of the cable processing facility and other places where operators are available configured to determine; and
a rule set to determine a shortest path between operators and respective cable processing machines.

5. The intermediary system (200) of claim 1, wherein the technical status evaluator (202) has a set of rules configured to determine a priority value for the received technical status data (TS1 to TSn), wherein the priority value is selected from the group of:
machine priority,
capability priority, or
the combination thereof, and
the technical status evaluator is further configured to select a cable processing machine based on a highest priority value.

6. The intermediary system (200) of claim 1, further comprising:
a skill database (204) configured to store skill profiles of the various operators, wherein the request composition component (203) is further configured to select the particular operator (10) based on the location data and a fit of the particular operator's skill profile with the capability.

7. The intermediary system (200) of claim 1, further comprising:
a voice instruction generator component (206) configured to generate voice instructions (VI-1) for the particular operator (10), the voice instructions (VI-1) related to an action to be performed by the particular operator (10) for restoring the capability of the particular cable processing machine (CPM 1) to enable the execution of the particular cable processing step, wherein the voice instructions (VI-1) are configured for audio output generation on the particular wearable audio device (11) associated with the operator (10).

8. The intermediary system (200) of claim 7, further comprising:
a data storage component (205) configured to store capability restoration data action patterns including technical instructions regarding the actions to be performed by the operator (10) wherein the technical instructions are a basis for the generated voice instructions (VI-1).

9. The intermediary system (200) of claim 8, wherein the data storage component (205) stores a set of capability restoration data action patterns for the particular capability and wherein the action patterns of the set correspond to different skill levels of the operators.

10. A method (2000) for controlling cable processing on a plurality of cable processing machines (CPM1 to CPMn) communicatively coupled via an intermediary system (200), the method comprising:
digitally receiving (2100), through an interface component which is digitally interconnected with the intermediary system (200) solely by digital data communication, at the intermediary system (200), location data (LD1, LD2, LD3) for a plurality of operators (10, 20, 30) wherein the location data of each operator describes a physical location (x, y) of the respective operator, the location data determined by at least one location sensor (12, 22, 32);

digitally receiving (2200), at the intermediary system (200), from each cable processing machine the technical status data (TS1 to TSn) of the respective cable processing machine wherein the technical status data for each cable processing machine is based on at least one physical parameter (P1, P2, Pn) indicating a capability of the respective cable processing machine for executing a cable processing step; identifying (2300), by the intermediary system (200), based on particular technical status data (TSI) of a particular cable processing machine (CPMI) a need for restoring a particular capability of the particular cable processing machine (CPM1) for executing a particular cable processing step;

digitally generating (2400), by the intermediary system (200), an operator request (OR1) with voice instructions (VI-1) for a particular operator (10), the operator request (OR1) based on the identified need, the technical status data (TS2 to TSn) of the other cable processing machines (CPM2 to CPMn), and the location data (LD1, LD2, LD3) for the plurality of operators (10, 20, 30);

digitally forwarding (2500) the operator request (OR1) to a wearable audio output device (11) of the particular operator (10), and the particular operator (10) being one of the plurality of operators (10, 20, 30) for which location data (LD1, LD2, LD3) was received by the interface component (210; and digitally receiving (2600), at the intermediary system (200), from the at least one particular cable processing machine (CPM1) a technical status data update when the particular capability for executing the particular cable processing step is restored;

providing a technical status evaluator (202) configured to identify, based on particular technical status data (TS1) of a particular cable processing machine (CPM1) a need for restoring the particular capability of the particular cable processing machine (CPM1) for executing the particular cable processing step; and a request composition component (203) configured to generate the operator request (OR1) with voice instructions (VI-1) for the particular operator (10), the operator request (OR1) based on the identified need, the technical status data (TS2 to TSn) of the other cable processing machines (CPM2 to CPMn), and the location data (LD1, LD2, LD3) for the plurality of operators (10, 20, 30) wherein the technical status evaluator is further configured to select a cable processing machine based on a highest priority value, and the highest priority is determined by the technical status evaluator based upon at least 1) a priority of the cable processing machine (CPM2 to CPMn) in need for restoring the particular capability, and 2) a skill profile of the plurality of operators (10, 20, 30) stored in a skill database (204).

11. The method of claim 10, wherein the at least one physical parameter value is selected from the group of: closure size of a straightener tool, gripper pressure of a gripper tool, strip quality achieved by a stripping tool, and crimp height achieved by a crimp tool.

12. The method of claim 10, further comprising:
determining a shortest path between operators and respective cable processing machines by using a map of the cable processing facility and other places where operators are available and applying a rule set to evaluate the operators' current locations in view of the locations of the cable processing machines.

13. The method of claim 10, further comprising:
the priority value is further selected from the group of: machine priority, capability priority, or the combination thereof, and the technical status evaluator.

14. The method of claim 10, further comprising:
selecting the particular operator (10) based on the proximity data and a fit of the particular operator's skill profile with the capability wherein a skill database stores skill profiles of the various operators.

15. The method of claim 10, further comprising:
generating voice instructions (VI-1) for the particular operator (10), the voice instructions (VI-1) related to an action to be performed by the particular operator (10) for restoring the capability of the particular cable processing machine (CPM1) to enable the execution of the particular cable processing step, wherein the voice instructions (VI-1) are configured for audio output generation on the particular wearable audio device (11) associated with the operator (10).

16. A cable processing control intermediary system (200) for automatically controlling cable processing of a plurality of cable processing machines (CPM1 to CPMn), the cable processing control intermediary system (200) comprising:

an electronic interface component (210) being digitally connected for communicating with the cable processing control intermediary system (200) solely by digital data communication, and the interface component (210) being configured to:

digitally receive location data (LD1, LD2, LD3) for a plurality of operators (10, 20, 30), wherein the location data of each operator describes a physical location (x, y) of the respective operator, and the location data determined by at least one location sensor (12, 22, 32);

digitally receive from each cable processing machine (CPM1 to CPMn) technical status data (TS1 to TSn) of the respective cable processing machine, wherein the technical status data for each cable processing machine is based on at least one physical parameter (P1, P2, Pn) indicating a capability of the respective cable processing machine (CPM1 to CPMn) for executing a cable processing step;

digitally forward an operator request (OR1) to a wearable audio output device (11) of a particular operator (10), and the particular operator (10) being one of the plurality of operators (10, 20, 30) for which location data (LD1, LD2, LD3) was received by the interface component (210);

digitally receive from a particular cable processing machine (CPM1) a technical status data update once a particular capability for executing a particular cable processing step is restored; and at least one computing component (220) being digitally connected to the interface component (210), the at least one computing component (220) comprising:

a technical status evaluator (202) being configured to identify, based on particular technical status data (TS1) of a particular cable processing machine (CPM1) a need for restoring the particular capability of the particular cable processing machine (CPM1) for executing the particular cable processing step; and a request composition component (203) being configured to generate the operator request (OR1) with voice instructions (VI-1) for the particular operator (10), the operator request (OR1) based on the identified need, the technical status data (TS2 to TSn) of the other cable processing machines (CPM2 to CPMn), and the location data (LD1, LD2, LD3) for the plurality of operators (10, 20, 30); and the technical status evaluator (202) operating according to a set of rules which are configured to determine a priority value for the received technical status data (TS1 to TSn) based upon at least 1) a priority of the cable processing machine (CPM2 to CPMn) requiring serving and 2) a skill profile the plurality of operators (10, 20, 30) stored in a skill database (204) configured to store skill profiles of each of the plurality of operators.

17. The intermediary system (200) of claim 16, further comprising:

a skill database (204) configured to store skill profiles of the various operators, wherein the request composition component (203) is further configured to select the particular operator (10) based on the location data and a fit of the particular operator's skill profile with the capability.

18. The intermediary system (200) of claim 16, further comprising:

a voice instruction generator component (206) configured to generate voice instructions (VI-1) for the particular operator (10), the voice instructions (VI-1) related to an action to be performed by the particular operator (10) for restoring the capability of the particular cable processing machine (CPM1) to enable the execution of the particular cable processing step, wherein the voice instructions (VI-1) are configured for audio output generation on the particular wearable audio device (11) associated with the operator (10).

* * * * *